(12) United States Patent
Ma et al.

(10) Patent No.: US 10,069,715 B2
(45) Date of Patent: Sep. 4, 2018

(54) METHOD FOR DEPLOYING RESOURCE IN CLOUD COMPUTING ENVIRONMENT

(71) Applicant: G-CLOUD TECHNOLOGY LTD, Dongguan, Guangdong (CN)

(72) Inventors: Guicheng Ma, Guangdong (CN); Song Yang, Guangdong (CN); Zhanpeng Mo, Guangdong (CN); Tongkai Ji, Guangdong (CN)

(73) Assignee: G-CLOUD TECHNOLOGY LTD, Dongguan, Guangdong (CN)

( * ) Notice: Subject to any disclaimer, the term of this patent is extended or adjusted under 35 U.S.C. 154(b) by 1001 days.

(21) Appl. No.: 14/389,740

(22) PCT Filed: Aug. 12, 2013

(86) PCT No.: PCT/CN2013/081306
§ 371 (c)(1),
(2) Date: Sep. 30, 2014

(87) PCT Pub. No.: WO2015/003420
PCT Pub. Date: Jan. 15, 2015

(65) Prior Publication Data
US 2015/0381470 A1    Dec. 31, 2015

(30) Foreign Application Priority Data

Jul. 9, 2013 (CN) .......................... 2013 1 0288113

(51) Int. Cl.
*G06F 15/16* (2006.01)
*H04L 12/751* (2013.01)
*G06F 9/50* (2006.01)
*H04L 29/08* (2006.01)
*H04L 29/06* (2006.01)

(52) U.S. Cl.
CPC ............ *H04L 45/02* (2013.01); *G06F 9/5072* (2013.01); *H04L 67/10* (2013.01); *H04L 67/42* (2013.01)

(58) Field of Classification Search
CPC ....... G06F 9/5072; H04L 45/02; H04L 67/10; H04L 67/42
See application file for complete search history.

(56) References Cited

U.S. PATENT DOCUMENTS

| | | | | |
|---|---|---|---|---|
| 9,276,816 | B1 * | 3/2016 | Conte | ..................... H04L 41/12 |
| 9,313,281 | B1 * | 4/2016 | Lietz | ...................... H04L 67/16 |
| 2007/0043831 | A1 * | 2/2007 | Kessler | .................. H04L 67/34 |
| | | | | 709/219 |

(Continued)

*Primary Examiner* — Normin Abedin

(57) ABSTRACT

In the field of network resource deployment technology, a method for deploying resource in a cloud computing environment comprises steps of: installing a distributed communication module and a resource deployment module on each one of a plurality of nodes; via a first resource deployment module on a first node in the plurality of nodes, sending a request for resource deployment to other nodes by a user; and transmitting the resource among the distributed communication module; if the first distributed communication module on the first node detects that a destination of the request for resource deployment comprises the first resource deployment module in local, sending the request to the first resource deployment module; deploying the resource by resource deployment modules of all destinations.

1 Claim, 2 Drawing Sheets

(56) References Cited

U.S. PATENT DOCUMENTS

2013/0311551 A1* 11/2013 Thibeault .............. G06F 9/5055
709/203
2015/0381470 A1* 12/2015 Ma ........................ G06F 9/5072
709/203

* cited by examiner

METHOD FOR DEPLOYING RESOURCE IN CLOUD COMPUTING ENVIRONMENT

CROSS REFERENCE OF RELATED APPLICATION

This is a U.S. National Stage under 35 U.S.C 371 of the International Application PCT/CN2013/081306, filed Aug. 12, 2013, which claims priority under 35 U.S.C. 119(a-d) to CN 201310288113.1, filed Jul. 9, 2013.

BACKGROUND OF THE PRESENT INVENTION

Field of Invention

The present invention relates to the field of network resource deployment technology, and more particularly to a method for deploying resource in a cloud computing environment.

Description of Related Arts

With the rapid development of cloud computing technology, the demand of users for service is increasingly high. Multiple companies or governments deploy a plurality of servers to provide services. The number of nodes of the servers of the companies or governments is over 100. If the conventional point-to-point deployment is adopted for managing resource deployment with such large scaled nodes, it will not only be a nightmare for the maintainers but also cause problems as follows.

(1) The huge number of the nodes leads to a complicated management. Excessive number of connections leads to a complicated resource deployment. When the IP of one node changes, multiple nodes need re-connecting.

(2) The resource deployment is repetitive and not capable of being accomplished once for all.

(3) The cross-segment resource deployment requires frequently changing configuration of routers.

Under circumstances of large scaled nodes, a simple, fast and one-time method for deploying resource is capable of greatly relieving the stress of the maintainers and reducing utilizing difficulties of ordinary users. In order to reduce the work of the resource deployment, it is necessary to provide a fast method for deploying resource in distributed environment.

SUMMARY OF THE PRESENT INVENTION

Accordingly, the present invention provides a fast method for deploying resource in a cloud computing environment, so as to solve the technical problems of slow point-to-point resource deployment and etc.

In order to solve the technical problems mentioned above, technical solutions provided by the present invention.

A method for deploying resource in a cloud computing environment comprises steps of:

step 1: installing a distributed communication module and a resource deployment module on each one of a plurality of nodes;

step 2: via a first resource deployment module on a first node in the plurality of nodes, sending a request for resource deployment to other nodes by a user;

step 3: when the first distributed communication module on the first node detects that a destination of the request for resource deployment comprises the first resource deployment module in local, sending the request to the first resource deployment module by the first distributed communication module; continually transmitting resource among the distributed communication modules when other destinations are detected;

step 4: deploying the resource by resource deployment modules of all destinations;

step 5: terminating deploying the resource.

Preferably, each distributed communication module is capable of serving as not only a server terminal but also a client terminal; and the first distributed communication module on the first node is connected with a distributed communication module on a closest node.

Preferably, each resource deployment module reads a name on a corresponding configuration file and registers the name to the corresponding distributed communication module, then the corresponding distributed communication module updates a routing table; wherein each resource deployment module has a different name, so as to uniquely represent the resource deployment modules on different nodes.

The transmitting resource among the distributed communication modules comprises steps of:

step I: sending the request for resource deployment by a second resource deployment module on a second node to a second distributed communication module on the same node;

step II: looking up a routing table by the second distributed communication module; if the second distributed communication module finds that a receiver comprises the second resource deployment module in local, carrying out step III, otherwise carrying out step IV;

step III: transmitting a resource to the second resource deployment module by the distributed communication module in local; deleting a name of the second resource deployment module by a destination of the request for the resource deployment; and deploying the resource by the second resource deployment module; and step IV: if the request for the resource deployment has other destinations, looking up the routing table of the receiver by the distributed communication module to obtain connections to a next distributed communication module, and sending the request for the resource deployment to the next distributed communication module.

The step of updating the routing table specifically comprises steps of:

step A: receiving a registering request from the resource deployment module serving as a client terminal by a local distributed communication module, obtaining the name registered, and setting a communication distance to be 1;

step B: if a next distributed communication module exists, informing the next distributed communication module;

step C: receiving a registering notification from a new client terminal by the next distributed communication module, adding 1 to the communication distance; judging whether the registered name exists, if no, carrying out step D; if yes, carrying out step E;

step D: directly carrying out the step B according to the name of the client terminal newly added to the routing table, records of connections of a previous distributed communication module and communication distances;

step E: if the registered name exists, comparing a previous communication distance with a current communication distance; if the current communication distance is shorter, carrying out a step F, otherwise carrying out the step B;

step F: updating a connection of the distributed communication module corresponding to the name of the client terminal recorded in the routing table as the previous distributed communication module and a latest communication distance.

The method for deploying resource in the cloud computing environment of the present invention is capable of deploying a virtual machine image, node controller, monitoring agents, serial communication facility and logical volume controller from a resource deployment software nameA to the nodes B, C and D on a subnet 1 and the node E on a subnet 2. Users only have to fill destination names of nameB, nameC, nameD and name E in the resource deployment software nameA and send a request, in such a manner that a simple, fast and one-time request for deploying resource is achieved. Since the distributed communication module is not based on a specific operating system but socket communication, the distributed communication module is capable of deploying the resource to different operating system. Utilizing the method for deploying resource of the present invention, in order to establish a distributed communication environment among N nodes, at least N−1 connections are required for communicating with each other, which is similar to N points on a straight line. Of course, more connections can be established, and a number of the connections is determined according to specific deployment circumstance.

These and other objectives, features, and advantages of the present invention will become apparent from the following detailed description, the accompanying drawings, and the appended claims.

BRIEF DESCRIPTION OF THE DRAWINGS

Further description of the present invention is illustrated combining with the accompanying drawings.

DETAILED DESCRIPTION OF THE PREFERRED EMBODIMENT

Figure 1:
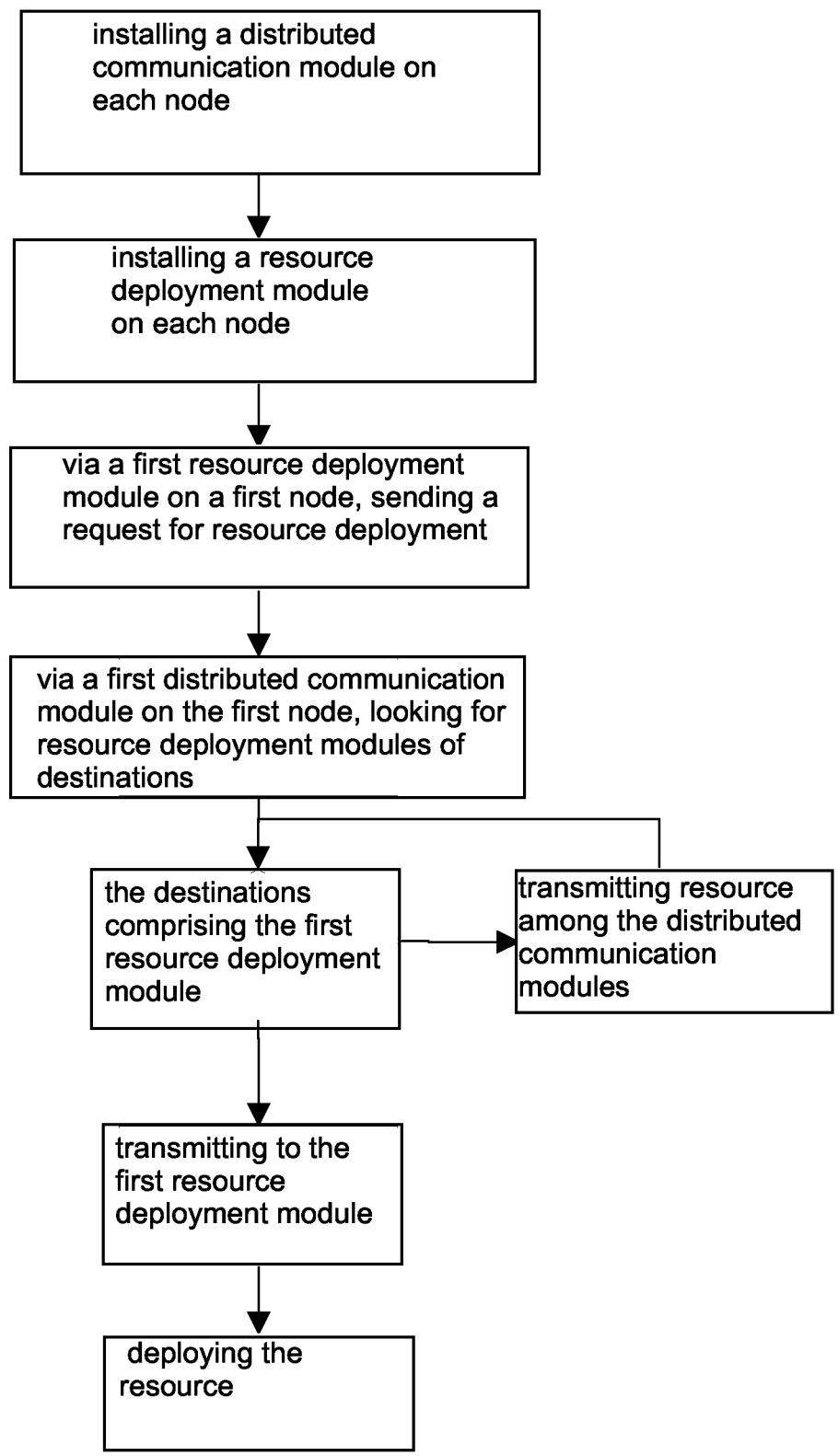
FIG. 1 is a flow chart of a fast method for deploying resource of the present invention.

Referring to FIG. 1 of the drawings, according to a preferred embodiment of the present invention, a fast method for deploying resource in a cloud computing environment comprises steps of:

step 1: installing a distributed communication module and a resource deployment module on each one of a plurality of nodes;

step 2: via a first resource deployment module on a first node in the plurality of nodes, sending a request for resource deployment to other nodes by a user;

step 3: when the first distributed communication module on the first node detects that a destination of the request for resource deployment comprises the first resource deployment module in local, sending the request to the first resource deployment module by the first distributed communication module; continually transmitting resource among the distributed communication modules when other destinations are detected;

step 4: deploying the resource by resource deployment modules of all destinations;

step 5: terminating deploying the resource.

Preferably, each distributed communication module is capable of serving as not only a server terminal but also a client terminal; and the first distributed communication module on the first node is connected with a distributed communication module on a closest node. In order to establish a distributed communication environment among N nodes, at least N−1 connections are required for communicating with each other, which is similar to N points on a straight line. Of course, more connections can be established, and a number of the connections is determined according to specific deployment circumstance.

Preferably, each resource deployment module reads a name on a corresponding configuration file and registers the name to a corresponding distributed communication module, then the distributed communication module corresponded updates a routing table; wherein each resource deployment module has a different name, so as to uniquely represent the resource deployment modules on different nodes.

The transmitting resource among the distributed communication modules comprises steps of:

step I: sending the request for resource deployment by a second resource deployment module on a second node to a second distributed communication module on the same node;

step II: looking up a routing table by the second distributed communication module; if the second distributed communication module finds that a receiver comprises a resource deployment module, carrying out step III, otherwise carrying out step IV;

step III: transmitting a resource to the second resource deployment module by the distributed communication module on the same node; deleting a name of the second resource deployment module by the destination of the request for the resource deployment; and deploying the resource by the second resource deployment module; and step IV: if the request for the resource deployment has other destinations, looking up the routing table of the receiver by the distributed communication module to obtain connections to a next distributed communication module, and sending the request for the resource deployment to the next distributed communication module.

The step of updating the routing table specifically comprises steps of:

step A: receiving a registering request from the resource deployment module serving as a client terminal by a local distributed communication module, obtaining the name registered, and setting a communication distance to be 1;

step B: if a next distributed communication module exists, informing the next distributed communication module;

step C: receiving a registering notification from a new client terminal by the next distributed communication module, adding 1 to the communication distance; judging whether the registered name exists, if no, carrying out step D; if yes, carrying out step E;

step D: directly carrying out the step B according to the name of the client terminal newly added to the routing table, records of connections of a previous distributed communication module and communication distances;

step E: if the registered name exists, comparing a previous communication distance with a current communication distance; if the current communication distance is shorter, carrying out a step F, otherwise carrying out the step B;

step F: updating a connection of the distributed communication module corresponding to the name of the client terminal recorded in the routing table as the previous distributed communication module and a latest communication distance.

Figure 2:
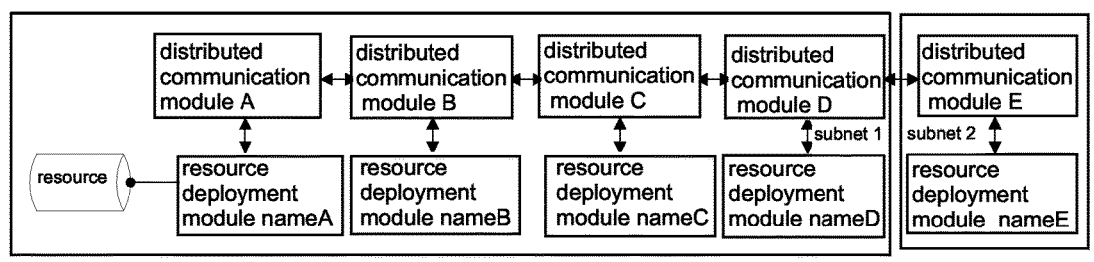
FIG. 2 is a flow chart of fast method for deploying resource according to a preferred embodiment of the present invention.

FIG. 2 shows a specific preferred embodiment of the present invention. In FIG. 2, a method for establishing a distributed platform comprises steps of:

(1) providing five nodes A, B, C, D and E of four servers; wherein the nodes A, B, C and D are on a first subnet 192.168.6.XXX and the node E is on a second subnet 192.168.10.XXX;

(2) establishing four connections of A~B, B~C, C~D and D~E among distributed communication modules, in such a manner that the node E and E are capable of accessing each other by setting of a router;

(3) starting a resource deployment module to read a name of a configuration file, registering the name of the configuration file to the distributed communication module;

(4) re-establishing the connections of B~C and C~D if an IP of the node C changes;

(5) sending a request for deploying resource via a resource deployment module nameA on the node A, wherein a list of destinations is resource deployment module nameB, resource deployment module nameC, resource deployment module nameD and resource deployment module nameE;

(6) judging that whether the list of the destinations comprises a name of the resource deployment module nameA by the distributed communication module A; if no, looking up a routing table by the distributed communication module A for seeking a next distributed communication module B, and sending the request for resource deployment to the distributed communication module B;

(7) judging that whether the list of the destinations comprises a name of the resource deployment module on the node nameB by the distributed communication module B;

if yes, sending the request for deploying resource to the resource deployment module nameB, automatically deploying the resource by the local resource deployment module on the node B, wherein the nameB is deleted from the list of the destinations, and a list of remaining destinations is nameC, nameD and nameE;

since the current list is not empty, seeking a next distributed communication module C and sending the request for deploying resource to the distributed communication module C;

(8) judging that whether the list of the destinations comprises the name of the resource deployment module nameC by the distributed communication module C;

if yes, sending the request for deploying resource to the resource deployment module nameC, automatically deploying the resource by the resource deployment module nameC, wherein the nameC is deleted from the list of the destinations, and a list of remaining destinations is nameD and nameE;

since the current list is not empty, seeking a next distributed communication module D and sending the request for deploying resource to the distributed communication module D;

(9) judging that whether the list of the destinations comprises the name of the resource deployment module nameD by the distributed communication module D;

if yes, sending the request for deploying resource to the resource deployment module nameD, automatically deploying the resource by the resource deployment module nameD, wherein the nameD is deleted from the list of the destinations, and a list of remaining destination is nameE;

since the current list is not empty, seeking a next distributed communication module E and sending the request for deploying resource to the distributed communication module E;

(10) judging that whether the list of the destinations comprises the name of the resource deployment module nameE by the distributed communication module E;

if yes, sending the request for deploying resource to the resource deployment module nameE, automatically deploying the resource by the resource deployment module nameE, wherein the nameE is deleted from the list of the destinations; terminating deploying resource, because the current list is empty.

Due to the simple connections, the simple setting of the router, convenient management and cross-platforms and etc., the deployment of the present invention is very fast. While deploying the resource from the nameC to nodes on both sides thereof, the advantages are more apparent.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for deploying resource in a cloud computing environment, comprising steps of:

step 1: installing a distributed communication module and a resource deployment module on each one of a plurality of nodes;

step 2: via a first resource deployment module on a first node in the plurality of nodes, sending a request for resource deployment to other nodes by a user;

step 3: when the first distributed communication module on the first node detects that a destination of the request for resource deployment comprises the first resource deployment module in local, sending the request to the first resource deployment module by the first distributed communication module; continually transmitting resource among the distributed communication modules when other destinations are detected;

step 4: deploying the resource by resource deployment modules of all destinations; and step 5: terminating deploying the resource;

wherein each distributed communication module is capable of serving as not only a server terminal but also a client terminal; and the first distributed communication module on the first node is connected with a distributed communication module on a closest node;

wherein each resource deployment module reads a name on a corresponding configuration file and registers the name to a corresponding distributed communication module, then the distributed communication module corresponded updates a routing table; wherein each resource deployment module has a different name, so as to uniquely represent the resource deployment modules on different nodes;

wherein the transmitting resource among the distributed communication modules comprises steps of:

step I: sending the request for resource deployment by a second resource deployment module on a second node to a distributed communication module on the same node;

step II: looking up a routing table by the second distributed communication module; if the second distributed communication module finds that a receiver comprises the second resource deployment module in local, carrying out the step III, otherwise carrying out the step IV;

step III: transmitting a resource to the second resource deployment module by the distributed communication module in local; deleting a name of the second resource deployment module in local by a destination of the request for the resource deployment; and deploying the resource by the second resource deployment module; and step IV: if the request for the resource deployment has other destinations, looking up the routing table of the receiver by the distributed communication module to obtain connections to a next distributed communication module, and sending the request for the resource deployment to the next distributed communication module;

wherein updating the routing table comprises steps of:

step A: receiving a registering request from the resource deployment module serving as a client terminal by a local distributed communication module, obtaining the name registered, and setting a communication distance to be 1;

step B: if a next distributed communication module exists, informing the next distributed communication module;

step C: receiving a registering notification from a new client terminal by the next distributed communication module, adding 1 to the communication distance; judging whether the registered name exists, if no, carrying out step D; if yes, carrying out step E;

step D: directly carrying out the step B according to the name of the client terminal newly added to the routing table, records of connections of a previous distributed communication module and communication distances;

step E: if the registered name exists, comparing a previous communication distance with a current communication distance; if the current communication distance is shorter, carrying out a step F, otherwise carrying out the step B; and step F: updating a connection of the distributed communication module corresponding to the name of the client terminal recorded in the routing table as the previous distributed communication module and a latest communication distance.

\* \* \* \* \*